United States Patent [19]
Okamoto et al.

[11] Patent Number: 5,806,306
[45] Date of Patent: Sep. 15, 1998

[54] DETERIORATION MONITORING APPARATUS FOR AN EXHAUST SYSTEM OF AN INTERNAL COMBUSTION ENGINE

[75] Inventors: Yoshiyuki Okamoto, Anjo; Yasumasa Kaji, Toyota; Hisashi Iida, Kariya, all of Japan

[73] Assignee: Nippondenso Co., Ltd., Kariya, Japan

[21] Appl. No.: 663,720

[22] Filed: Jun. 14, 1996

[30] Foreign Application Priority Data

Jun. 14, 1995 [JP] Japan .................................. 7-147006

[51] Int. Cl.⁶ .......................................................... F01N 3/20
[52] U.S. Cl. ............................................. 60/277; 60/285
[58] Field of Search ............................. 60/276, 277, 285

[56] References Cited

U.S. PATENT DOCUMENTS

| | | | |
|---|---|---|---|
| 4,677,955 | 7/1987 | Takao | 123/688 |
| 4,739,614 | 4/1988 | Katsuno et al. | 60/276 |
| 5,090,199 | 2/1992 | Ikuta et al. | 60/277 |
| 5,157,920 | 10/1992 | Nakaniwa | 60/276 |
| 5,255,662 | 10/1993 | Nakajima | 60/276 |
| 5,417,061 | 5/1995 | Maeda et al. | 60/277 |
| 5,579,637 | 12/1996 | Yamashita et al. | 60/277 |
| 5,610,321 | 3/1997 | Shinmoto | 60/277 |
| 5,622,047 | 4/1997 | Yamashita et al. | 60/277 |

FOREIGN PATENT DOCUMENTS

| | | |
|---|---|---|
| 61-132747 | 6/1986 | Japan . |
| 62-223433 | 10/1987 | Japan . |
| 4-109051 | 4/1992 | Japan . |
| 6-17640 | 1/1994 | Japan . |
| 7-97958 | 4/1995 | Japan . |

*Primary Examiner*—Sheldon Richter
*Attorney, Agent, or Firm*—Cushman Darby & Cushman IP Group of Pillsbury Madison & Sutro LLP

[57] ABSTRACT

A deterioration monitoring apparatus for an exhaust system of an internal combustion engine includes an air-fuel ratio control system and a deterioration determining circuit. The air-fuel ratio control system controls an air-fuel ratio of exhaust emissions flowing downstream of a catalytic converter disposed in the exhaust system of the engine to agree with a target downstream air-fuel ratio under feedback control based on an air-fuel ratio of exhaust emissions flowing upstream of the catalytic converter and the air-fuel ratio of the exhaust emissions flowing downstream of the catalytic converter. The deterioration determining circuit determines whether the exhaust system such as an oxygen sensor mounted downstream of the catalytic converter or the catalytic converter is deteriorated or not based on the air-fuel ratio of the exhaust emissions flowing downstream of the catalytic converter and the target downstream air-fuel ratio.

5 Claims, 9 Drawing Sheets

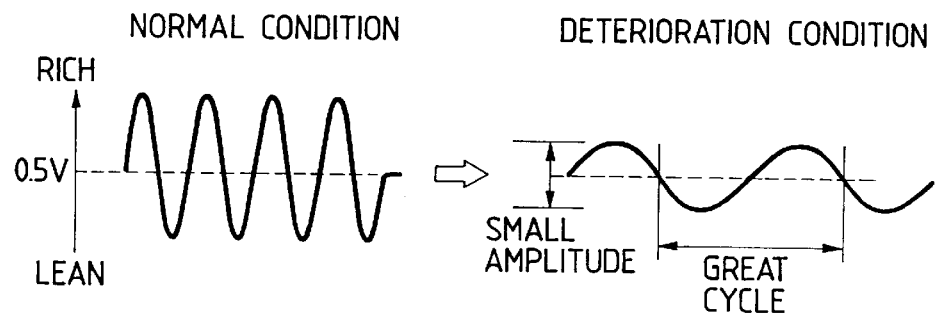
FIG. 6(a) NORMAL CONDITION
FIG. 6(b) DETERIORATION CONDITION — SMALL AMPLITUDE, GREAT CYCLE
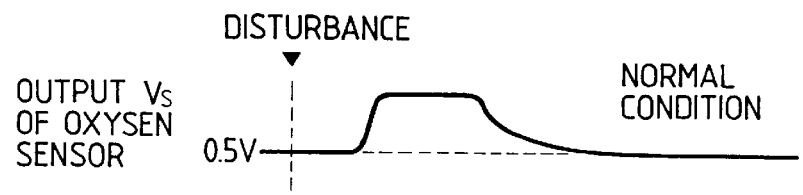
FIG. 7(a) OUTPUT $V_S$ OF OXYSEN SENSOR — NORMAL CONDITION
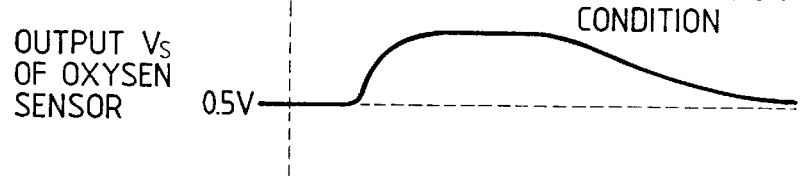
FIG. 7(b) OUTPUT $V_S$ OF OXYSEN SENSOR — DETERIORATION CONDITION
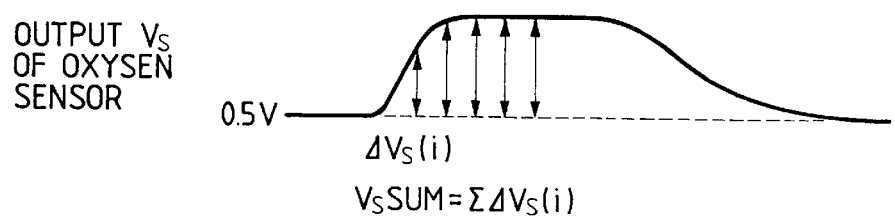
FIG. 8 OUTPUT $V_S$ OF OXYSEN SENSOR
$\Delta V_S(i)$
$V_S \mathrm{SUM} = \Sigma \Delta V_S(i)$

DETERIORATION MONITORING APPARATUS FOR AN EXHAUST SYSTEM OF AN INTERNAL COMBUSTION ENGINE

BACKGROUND OF THE INVENTION

1 Technical Field

The present invention relates generally to a deterioration monitoring apparatus for an exhaust system of an internal combustion engine, and more particularly to a deterioration monitoring apparatus designed to determine deterioration of a catalytic converter or a sensor installed in an exhaust line of an internal combustion engine.

2 Background of Related Art

Japanese Patent First Publication No. 6-17640 teaches an exhaust system malfunction monitoring system which includes an air-fuel ratio sensor mounted upstream of a catalytic converter and an oxygen sensor mounted downstream of the catalytic converter. The air-fuel ratio sensor outputs an air-fuel ratio signal in proportion to an air-fuel ratio of a mixture contained in exhaust emissions for controlling the air-fuel ratio of the exhaust emissions under feedback control. The oxygen sensor determines whether the air-fuel ratio of the exhaust emissions is rich or lean. The system shifts a target air-fuel ratio temporarily by a given value for changing an output of the oxygen sensor above a saturation criterion to calculate a maximum amount of $O_2$ the catalytic converter can adsorb until it is saturated therewith (hereinafter, referred to as the amount of $O_2$ saturation adsorption) based on air-fuel control data for determining deterioration of the catalytic converter.

Such a prior art system, however, has the drawback in that it is impossible to determine the deterioration of an exhaust system other than a catalytic converter such as an oxygen sensor disposed downstream of the catalytic converter (hereinafter, referred to as a downstream sensor). Particularly, in a feedback control system that corrects air-fuel ratio feedback control using an output of an air-fuel ratio sensor upstream of a catalytic converter so as to decrease a difference between an output voltage of a downstream sensor and a target voltage, the deterioration of the downstream sensor reduces the accuracy of the air-fuel ratio feedback control.

SUMMARY OF THE INVENTION

It is therefore a principal object of the present invention to avoid the disadvantages of the prior art.

It is another object of the present invention to provide an improved deterioration monitoring apparatus for an exhaust system of an internal combustion engine designed to determine the deterioration of the exhaust system including a downstream sensor with high accuracy.

According to one aspect of the present invention, there is provided a deterioration monitoring apparatus for an exhaust system of an internal combustion engine which includes an air-fuel ratio controlling means for controlling an air-fuel ratio of exhaust emissions flowing downstream of a catalytic converter disposed in the exhaust system of the engine to agree with a target downstream air-fuel ratio under feedback control based on an air-fuel ratio of exhaust emissions flowing upstream of the catalytic converter and the air-fuel ratio of the exhaust emissions flowing downstream of the catalytic converter, and a deterioration determining means for determining whether the exhaust system is deteriorated or not based on the air-fuel ratio of the exhaust emissions flowing downstream of the catalytic converter and the target downstream air-fuel ratio.

In the preferred mode of the invention, the deterioration determining means determines whether the exhaust system is deteriorated or not based on an integral value of a difference between the air-fuel ratio of the exhaust emissions flowing downstream of the catalytic converter and the target downstream air-fuel ratio.

The air-fuel ratio controlling means corrects a target air-fuel ratio determined based on the air-fuel ratio of the exhaust emissions flowing upstream of the catalytic converter, using a target air-fuel ratio correction value determined based on the air-fuel ratio of the exhaust emissions flowing downstream of the catalytic converter to determine a feedback correction value, and also corrects the amount of fuel to be injected into the engine based on the feedback correction value. The deterioration determining means determines whether the exhaust system is deteriorated or not based on the target air-fuel ratio correction value.

A saturation adsorption determining means is further provided for determining the amount of saturation adsorption of the catalytic converter. The deterioration determining means determines whether the exhaust system is deteriorated or not based on the amount of saturation adsorption determined by the saturation adsorption determining means, the air-fuel ratio of the exhaust emissions flowing downstream of the catalytic converter, and the target downstream air-fuel ratio.

The deterioration determining means includes a deterioration criterion determining means for determining a deterioration criterion based on the amount of saturation adsorption of the catalytic converter and a total value determining means for determining differences between the air-fuel ratio of the exhaust emissions flowing downstream of the catalytic converter and the target downstream air-fuel ratio at every given time interval to determine a total value thereof. The deterioration determining means determines that the exhaust system is deteriorated when the total value is greater than a given value.

The deterioration determining means may determine a deterioration criterion based on the amount of saturation adsorption of the catalytic converter and determines that the exhaust system is deteriorated when the target air-fuel ratio correction value is greater than the deterioration criterion.

According to another aspect of the present invention, there is provided a deterioration monitoring apparatus for an exhaust system of an internal combustion engine which includes an injector for injecting fuel into an induction system of the engine, an upstream sensor for determining an air-fuel ratio of exhaust emissions flowing upstream of a catalytic converter installed in the exhaust system, a downstream sensor for determining an air-fuel ratio of exhaust emissions flowing downstream of the catalytic converter, a basic fuel injection determining means for determining a basic amount of fuel to be injected from the injector, an air-fuel ratio controlling means for controlling the air-fuel ratio determined by the upstream sensor under feedback control to correct the air-fuel ratio determined by the downstream sensor to agree with a target downstream air-fuel ratio, and a deterioration determining means for determining whether the exhaust system is deteriorated or not based on the air-fuel ratio determined by the downstream sensor and the target downstream air-fuel ratio.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 6(a) is a time chart which shows a waveform of an output voltage of an oxygen sensor in a normal condition;

FIG. 6(b) is a time chart which shows a waveform of an output voltage of an oxygen sensor when deteriorated;

FIG. 7(a) is a time chart which shows a variation in output Vs of an oxygen sensor after disturbance is raised when the oxygen sensor is in a normal condition;

FIG. 7(b) is a time chart which shows a variation in output Vs of an oxygen sensor after disturbance is raised when the oxygen sensor is deteriorated;

FIG. 8 is an explanatory view for determination of an integral value of a difference between an output voltage Vs of an oxygen sensor and a target voltage;

FIG. 12 is a graph which shows the relation between a deterioration criterion VLVL and the amount of $O_2$ saturation adsorption of a catalytic converter;

DESCRIPTION OF THE PREFERRED EMBODIMENT

Figure 1:
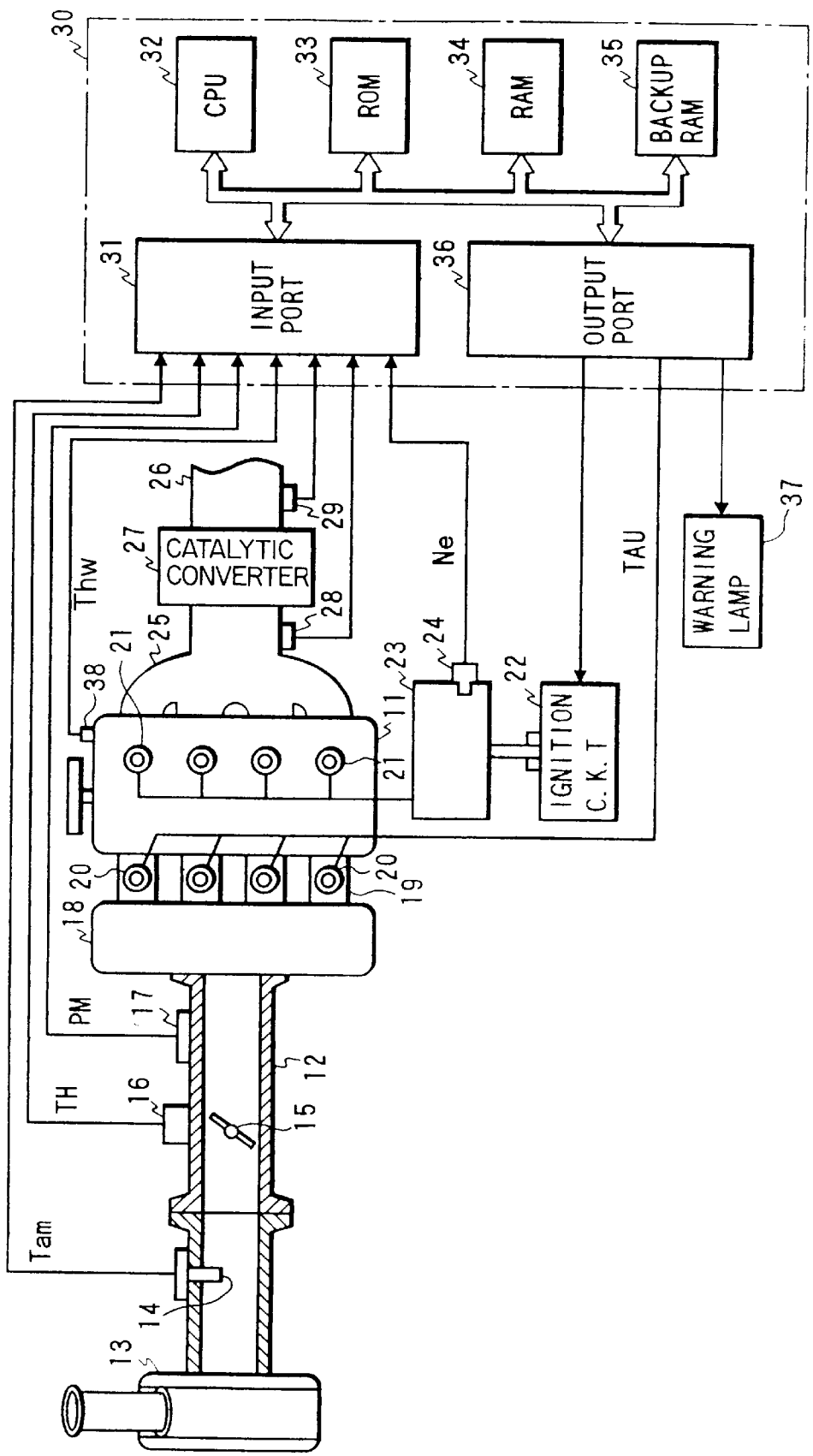
FIG. 1 is a block diagram which shows an engine control system with an exhaust system deterioration monitoring apparatus of the invention.

Referring now to the drawings, particularly to FIG. 1, there is shown an engine control system for an automotive vehicle with an exhaust system deterioration monitoring apparatus according to the present invention.

An air cleaner 13 is mounted upstream of an intake pipe 12 of an internal combustion engine 11. An inlet air temperature sensor 14 is disposed downstream of the air cleaner 13 which measures an inlet air temperature Tam. A throttle valve 15 and a throttle sensor 16 are disposed downstream of the inlet air temperature sensor 14. The throttle sensor 16 measures the degree of an opening (hereinafter, referred to as a throttle opening degree TH) of the throttle valve 15. An intake pipe pressure sensor 17 is disposed downstream of the throttle valve 15 which measures the pressure Pm in the intake pipe 12. A surge tank 18 is disposed downstream of the intake pipe pressure sensor 17. To the surge tank 18, an intake manifold 19 is connected to supply air into each cylinder of the engine 11. Injectors 20 are mounted on branches of the intake manifold 19, respectively, for injecting fuel into the engine cylinders.

In the engine 11, spark plugs 21 are mounted one for each cylinder. An ignition circuit 22 provides a high voltage current to each of the spark plugs 21 through a distributor 23. The distributor 23 has disposed thereon a crank angle sensor 24 which outputs, for example, 24 pulses every two turns of a crank shaft (i.e., 720°CA). An engine speed Ne is determined based on intervals of the pulses outputted from the crank angle sensor 24. The engine 11 has also mounted thereon a water temperature sensor 38 which measures the temperature Thw of the coolant circulating in the engine 11.

To an exhaust port (not shown) of the engine 11, an exhaust pipe 26 is connected through an exhaust manifold 25. In the middle of the exhaust pipe 26, a three way catalytic converter 27 is disposed which reduces levels of harmful emissions such as CO, HC, and NOX. Located upstream of the catalytic converter 27 is an air-fuel ratio sensor 28 which outputs a linear sensor signal in proportion to an air-fuel ratio of a mixture contained in exhaust emissions. An oxygen sensor 29 is disposed downstream of the catalytic converter 27 which outputs a sensor signal reversing in level when the air-fuel ratio of the exhaust emissions is switched between rich and lean sides.

Outputs of the above described sensors are fed to an electronic control circuit 30 through an input port 31. The electronic control circuit 30 includes a microcomputer consisting of a CPU 32, a ROM 33, a RAM 34, and a backup RAM 35. The microcomputer determines the amount of fuel TAU to be injected into the engine 11 and an ignition timing Ig based on engine operating condition parameters derived by the outputs of the sensors and outputs through an output port 36 control signals to the injectors 20 and the ignition circuit 22 and a warning signal to a warning lamp 37 if the deterioration of an exhaust system is detected.

The electronic control circuit 30 also corrects a target air-fuel ratio of a mixture contained in exhaust emissions so as to decrease a difference between the target air-fuel ratio and an output voltage of the oxygen sensor 29 under feedback control that controls an air-fuel ratio of the exhaust emissions based on an output of the air-fuel ratio sensor 28 and also determines that the exhaust system is deteriorated when an integral value of the difference between the output voltage of the oxygen sensor 29 and a target voltage exceeds a given deterioration criterion.

Figure 2:
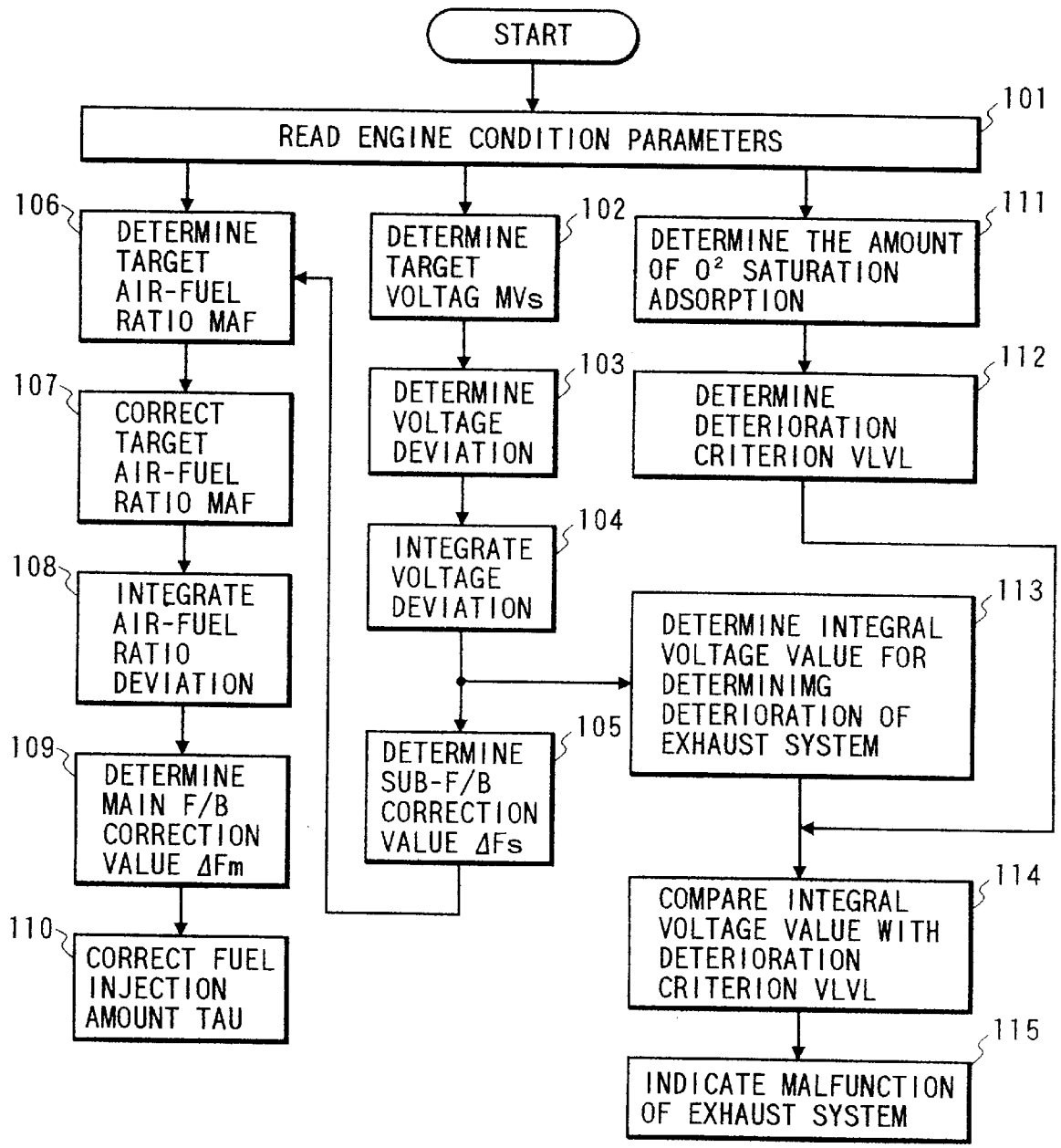
FIG. 2 is a flowchart of programs of main feedback control, sub-feedback control, and a deterioration determination.

FIG. 2 shows a flowchart of a program having three subroutines, as will be discussed later in detail, performed in given cycles by the electronic control circuit 30.

After entering the program, the routine proceeds to step 101 wherein engine condition parameters such as the engine speed Ne, the intake pipe pressure Pm, the throttle opening degree TH, the inlet air temperature Tam, and the coolant temperature Thw outputted from the sensors 24, 17, 16, 14, and 38 the air-fuel ratio signal AF outputted from the upstream sensor 28, and the output voltage Vs of the downstream sensor 29, are read.

Figure 15:
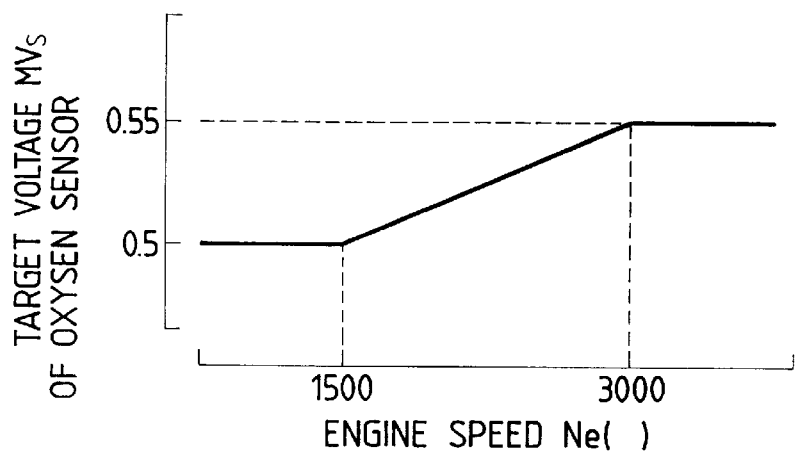
FIG. 15 is a map stored in a memory of an exhaust system deterioration monitoring apparatus which shows the relation between a target output voltage of an oxygen sensor MVs and an engine speed Ne.

The routine then proceeds to step 102 wherein a target voltage MVs is determined which is preselected based on the engine speed Ne and the intake pipe pressure Pm for controlling the output voltage of the oxygen sensor 29 to agree with a given voltage (determined based on a stoichiometric air-fuel ratio) under feedback control (see FIG. 15). The routine then proceeds to step 103 wherein a difference between an actual output voltage of the oxygen sensor 29 and the target voltage MVs (hereinafter, referred to as a voltage deviation) is determined. The routine then proceeds to step 104 wherein the voltage deviation is integrated. The routine then proceeds to step 105 wherein a sub-F/B correction value $\Delta$Fs, as will be described later in detail, is determined based on an integral value of the voltage deviation derived in step 104 for correcting the output voltage of the oxygen sensor 29 to agree with the target voltage MVs.

In the following discussion, the feedback (F/B) control carried out by steps 102 to 105 using the output of the oxygen sensor 29 will be referred to as sub-F/B control. The F/B control carried out by steps 106 to 110, as will be discussed below, using the output of the air-fuel ratio sensor 28 will be referred to as main F/B control.

Figure 14:
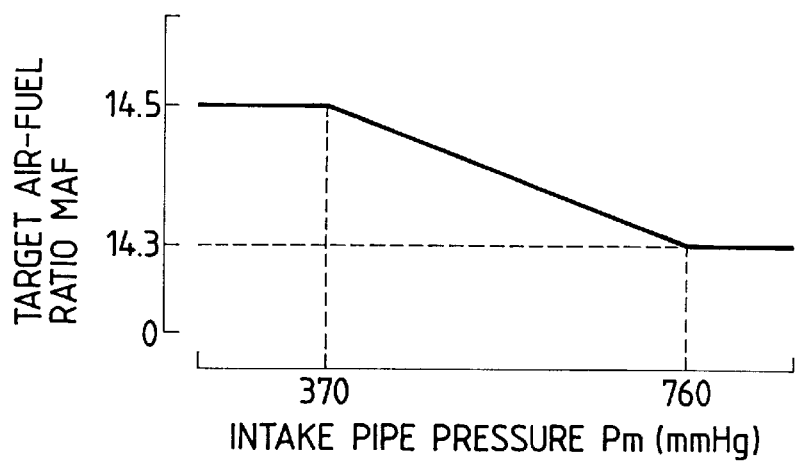
FIG. 14 is a map stored in a memory of an exhaust system deterioration monitoring apparatus which shows the relation between a target air-fuel ratio MAF and an intake pipe pressure Pm.

Upon initiation of the F/B control, the routine proceeds to step 106 wherein a target air-fuel ratio MAF for controlling the output of the air-fuel ratio sensor 28 to agree with the target air-fuel ratio MAF is determined by look-up using a map, as shown in FIG. 14, based on the intake pipe pressure Pm. The routine then proceeds to step 107 wherein the target air-fuel ratio MAF is corrected using the sub-F/B correction value $\Delta$Fs derived in step 105. For instance, when an air-fuel ratio downstream of the catalytic converter 27 is on the rich side, the target air-fuel ratio MAF under the main F/B control is corrected to the lean side for changing an air-fuel ratio upstream of the catalytic converter 27. Subsequently, a difference between an actual air-fuel ratio and the corrected target air-fuel ratio (hereinafter, referred to as an air-fuel ratio deviation) is determined.

The routine then proceeds to step 108 wherein the air-fuel ratio deviation derived in step 107 is integrated. The routine then proceeds to step 109 wherein a main F/B correction value $\Delta$Fm is determined using an integral value of the air-fuel ratio deviation derived in step 108. The routine then proceeds to step 110 wherein the fuel injection amount TAU is corrected based on the main F/B correction value $\Delta$Fm.

A subroutine from steps 111 to 115 is for determining deterioration of the exhaust system and for indicating a malfunction thereof through the warning lamp 37.

First, in step 111, the amount of $O_2$ saturation adsorption of the catalytic converter 27 is determined in a manner such as the one taught in Japanese Patent First Publication No. 6-17640 as discussed in the introductory part of this application. The routine then proceeds to step 112 wherein a deterioration criterion VLVL, as shown in FIG. 12, is determined based on the amount of $O_2$ saturation adsorption derived in step 111.

The routine then proceeds to step 113 wherein an integral voltage value for determining the deterioration of the exhaust system is determined based on the integral value of the voltage deviation derived in step 104. The routine then proceeds to step 114 wherein the integral voltage value is compared with the deterioration criterion VLVL derived in step 112. If the integral voltage value is greater than the deterioration criterion VLVL, then it is determined that the exhaust system is deteriorated, and the routine proceeds to step 115 wherein a malfunction of the exhaust system is indicated through the warning lamp 37.

Figure 3:
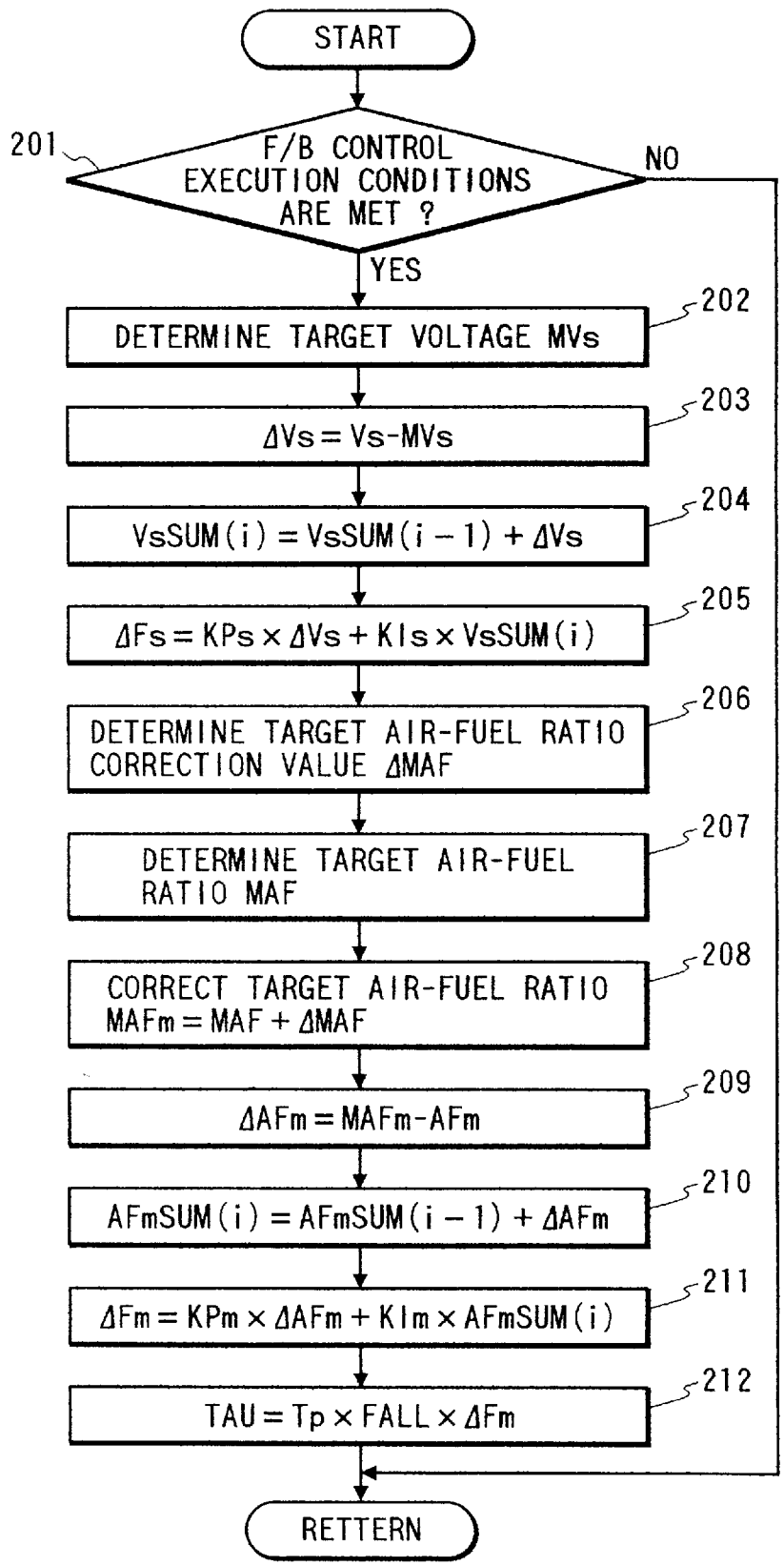
FIG. 3 is a flowchart of a program of air-fuel feedback control.

An operation of air-fuel ratio control using the main F/B control and the sub-F/B control will be discussed below in detail with reference to FIG. 3. The air-fuel ratio control is carried out cyclically at a given time interval (e.g., 16 ms or 32 ms) or at a given angular interval (e.g., 180°CA) of a crank shaft of the engine 11.

Upon initiation of this program, the routine proceeds to step 201 wherein it is determined whether air-fuel ratio F/B control execution conditions are met or not. If a NO answer is obtained, then the routine terminates. The air-fuel ratio F/B control execution conditions are that (1) the engine coolant temperature Thw is greater than a given value, and (2) the air-fuel ratio sensor 28 and the oxygen sensor 29 are activated sufficiently. If these conditions are satisfied in step 201, then the routine proceeds to step 202.

In step 202, the target voltage MVs on which the output of the oxygen sensor 29 is converged under the sub-F/B control is determined by look-up using the map, as shown in FIG. 15, based on the engine speed Ne. The routine then proceeds to step 203 wherein the voltage deviation $\Delta$Vs between the target voltage MVs and the actual voltage Vs of the oxygen sensor 29 is determined. The routine then proceeds to step 204 wherein the integral value VsSUM(i) of the voltage deviation $\Delta$Vs is determined using the following equation.

$$\text{VsSUM}(i)=\text{VsSUM}(i1)+\Delta\text{Vs}$$

where the suffix "(i)" indicates the current program cycle, and suffix "(i−1)" indicates the last program cycle. Specifically, the integral value VsSUM(i) is determined by adding the voltage deviation $\Delta$Vs derived in step 203 to the integral value VsSUM(i−1) derived one program cycle before.

The routine then proceeds to step 205 wherein the sub-F/B correction value $\Delta$Fs is determined according to the following equation using the voltage deviation $\Delta$Vs derived in step 203 and the integral value VsSUM(i) derived in step 204.

$$\Delta\text{Fs}=\text{KPs}\times\Delta\text{Vs}+\text{KIs}\times\text{VsSUM}(i)$$

where KPs is a proportional constant, and KIs is an integration constant.

Figure 4:
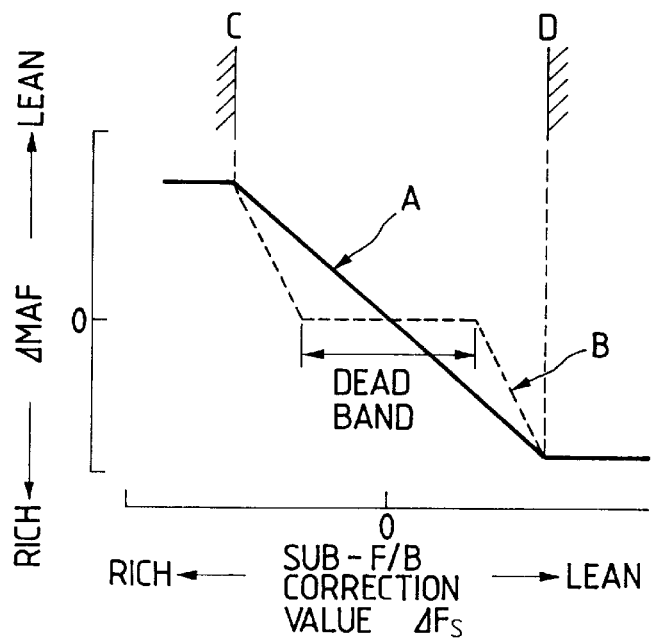
FIG. 4 is a graph which shows the relations between a target air-fuel ratio correction value ΔMAF and a sub-feedback correction value ΔFs.

The routine then proceeds to step 206 wherein the sub-F/B correction value $\Delta$Fs is converted into a target air-fuel ratio correction value $\Delta$MAF for correcting the target air-fuel ratio MAF under the main F/B control by look-up using the map, as shown in FIG. 4. For example, when the sub-F/B correction value $\Delta$Fs is rich, the target air-fuel ratio correction value ΔMAF which corrects the target air-fuel ratio MAF to the lean side is provided. Conversely, when the sub-F/B correction value ΔFs is lean, the target air-fuel ration correction value ΔMAF which corrects the target air-fuel ratio MAF to the rich side is provided.

FIG. 4 shows two types of maps, as expressed by a solid line A and a broken line B. The solid line A provides the target air-fuel ratio correction value ΔMAF varying in proportion to the sub-F/B correction value ΔFs, while the broken line B has a dead band across the sub-F/B correction value ΔFs of zero (0) to avoid hunting. Additionally, in either map, when the sub-F/B correction value ΔFs falls within a lower limit range defined by a lower limit C or an upper limit range defined by an upper limit D, the target air-fuel ratio correction value ΔMAF is maintained constant for avoiding excessive correction.

The routine then proceeds to step 207 wherein the target air-fuel ratio MAF under the main F/B control is determined by look-up using the map, as shown in FIG. 14, based on the intake pipe pressure Pm. The routine then proceeds to step 208 wherein the target air-fuel ratio MAF is corrected according to the following equation using the target air-fuel ratio correction value ΔMAF derived in step 206 to determine a new target air-fuel ratio MAFm.

MAFm=MAF+ΔMAF

The routine then proceeds to step 209 wherein the difference ΔAFm between the output AFm of the air-fuel ratio sensor 28 and the target air-fuel ratio MAFm is determined. The routine then proceeds to step 210 wherein the integral value AFmSUM of the difference ΔAFm is determined according the following equation.

AFmSUM(i)=AFmSUM (i−1) +ΔAFm

The routine then proceeds to step 211 wherein the main F/B correction value ΔFm is determined according to the following equation using the target air-fuel ratio MAFm and the difference ΔAFm.

ΔFm=KPm×ΔAFm+KIm×AFmSUM(i)

where KPm is a proportional constant, and KIm is an integration constant.

The routine then proceeds to step 212 wherein the fuel injection amount TAU is determined according to the following equation using a basic injection amount Tp derived by the intake pipe pressure Pm and a correction value FALL derived by the inlet air temperature Tam.

TAU=Tp×FALL×ΔFm where the correction value FALL includes correction values of the engine coolant temperature Thw and EGR and also includes FMW (manifold wet) as a transitional correction value.

After step 212, the routine terminates.

In step 208, the target air-fuel ratio MAF is corrected using the target air-fuel ratio correction value ΔMAF which is determined based on the sub-F/B correction value ΔFs, but the output of the air-fuel ratio sensor 28 may be corrected to the rich or lean side according to the sub-F/B correction value ΔFs.

Figure 5A:
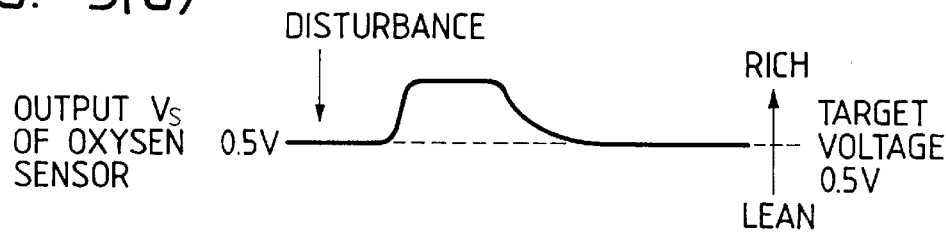
FIG. 5(a) is a time chart which shows a variation in output Vs of an oxygen sensor when disturbance is raised.
Figure 5B:
FIG. 5(b) is a time chart which shows a variation in sub-feedback correction value ΔFs when disturbance is raised.
Figure 5C:
FIG. 5(c) is a time chart which shows a variation in target air-fuel ratio MAFm under main feedback control when disturbance is raised.

FIGS. 5(a) to 5(c) are time charts showing variations in the output voltage Vs of the oxygen sensor 29 downstream of the catalytic converter 27, the sub-F/B correction value ΔFs, and the target air-fuel ratio MAFm (=MAF+ΔMAF) under the main F/B control when disturbance such as acceleration is raised.

When the disturbance is raised, the output voltage Vs of the oxygen sensor 29 downstream of the catalytic converter 27 is changed to the rich side. This increases the difference ΔVs between the output voltage Vs and the target voltage MVs. A proportional integral operation (i.e., ΔFs=KPs×ΔVs+KIs×VsSUM(i) in step 205) is performed on the difference ΔVs to derive the sub-F/B correction value ΔFs which is changed, as shown in FIG. 5(b), after the disturbance is raised. The target air-fuel ratio correction value ΔMAF under the main F/B control is determined by look-up using the map based on the sub-F/B correction value ΔFs. The target air-fuel ratio MAF is corrected by the target air-fuel ratio correction value ΔMAF to determine the target air-fuel ratio MAFm ultimately. This allows the target air-fuel ratio MAFm to be changed according to a change in the sub-F/B correction value ΔFs.

Figure 9:
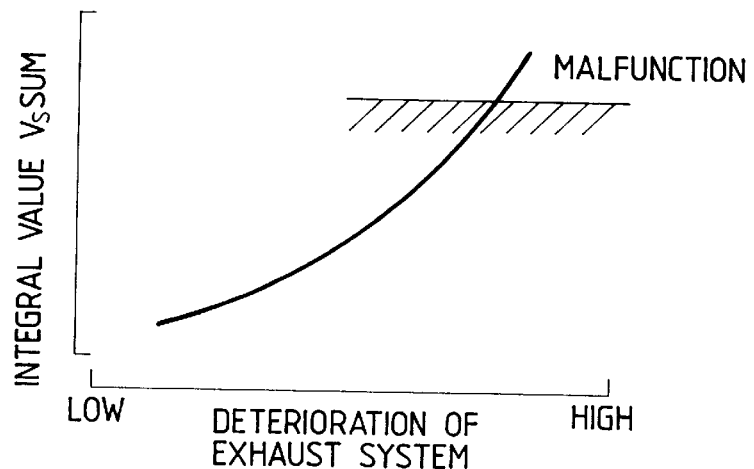
FIG. 9 is a graph which shows the relation between an integral value VsSUM of a difference between an output voltage of an oxygen sensor and a target voltage and the degree of deterioration of an exhaust system.

If the oxygen sensor 29 deteriorates, it will cause the output voltage thereof to be changed as shown in FIGS. 6(a) and 6(b). Specifically, the output voltage of the oxygen sensor 29 has a smaller amplitude and a greater cycle than normal. This causes, as shown in FIGS. 7(a) and 7(b), a change rate of the output voltage of the oxygen sensor 29 to be delayed as compared with normal, requiring more time for convergence of the output voltage of the oxygen sensor 29. As a result, the integral value VsSUM of the voltage deviation between the output voltage of the oxygen sensor 29 and the target voltage is increased. The VsSUM is, as already discussed in step 204 of FIG. 3, determined by summing up values of ΔV at every given time interval, as shown in FIG. 8. As apparent from the above discussion, the deterioration of the oxygen sensor 29 causes the integral value VsSUM of the voltage deviation ΔVs to be increased. This allows the exhaust system to be determined to be malfunctioning when the integral value VsSUM becomes greater than a given value, as shown in FIG. 9.

Figure 10A:
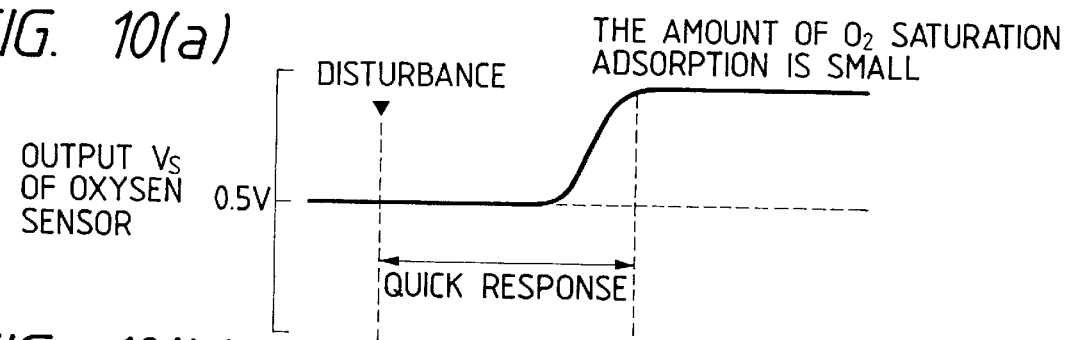
FIG. 10(a) is a time chart which shows a variation in output Vs an oxygen sensor in response to disturbance when the amount of $O_2$ saturation adsorption of a catalytic converter is small.
Figure 10B:
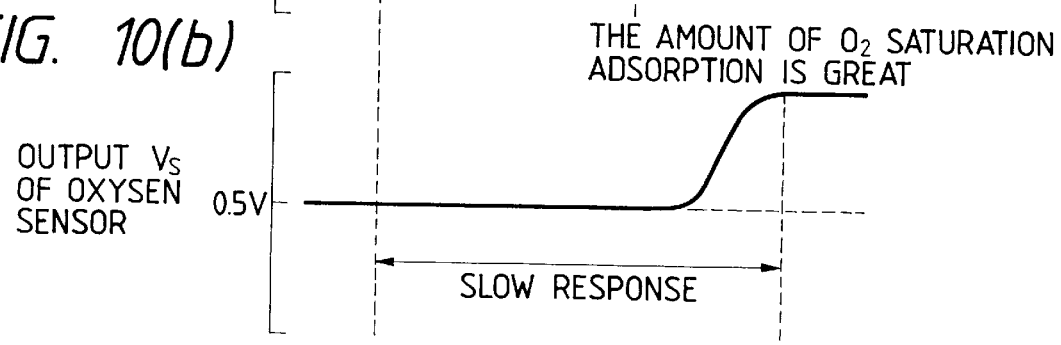
FIG. 10(b) is a time chart which shows a variation in output Vs of an oxygen sensor in response to disturbance when the amount of $O_2$ saturation adsorption of a catalytic converter is great.

The response of the oxygen sensor 29 is, as shown in FIGS. 10(a) and 10(b), different depending upon the amount of $O_2$ saturation adsorption of the catalytic converter 27. This is because when the amount of $O_2$ saturation adsorption of the catalytic converter 27 is small, $O_2$ flows downstream of the catalytic converter 27 in a short time. Therefore, the response of the oxygen sensor 29 after the disturbance such as acceleration of the engine, is raised quickly when the amount of $O_2$ saturation adsorption of the catalytic converter 27 is small, while it is raised slowly when the amount of $O_2$ saturation adsorption of the catalytic converter 27 is great.

Figure 11A:
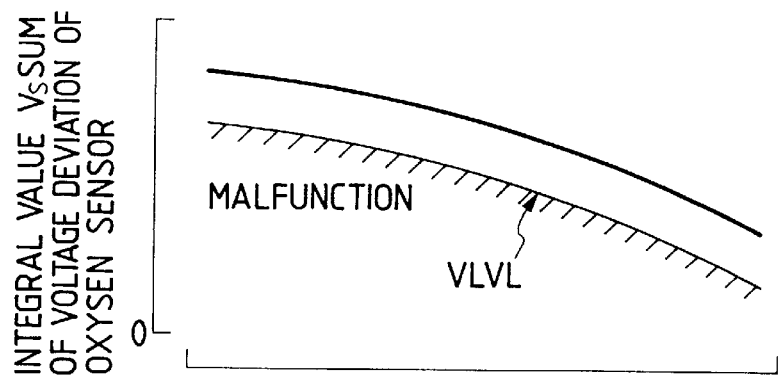
FIG. 11(a) is a graph which shows the relation between an integral value VsSUM of a difference between an output voltage of an oxygen sensor and a target voltage and a deterioration criterion VLVL when a catalytic converter is aged.
Figure 11B:
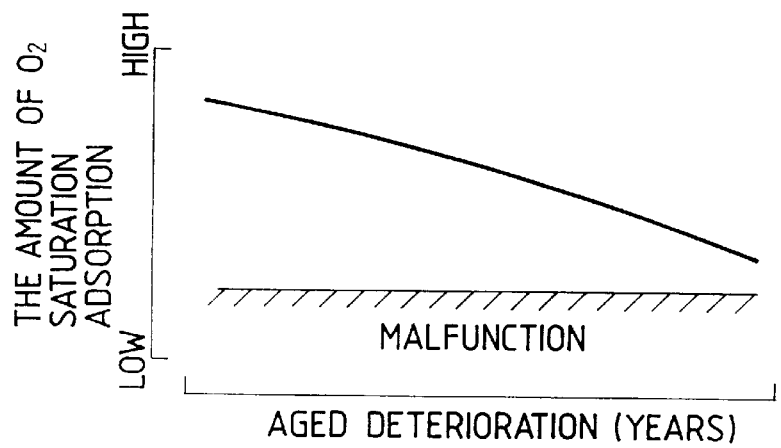
FIG. 11(b) is a graph which shows a variation in amount of $O_2$ saturation adsorption of a catalytic converter when aged.
Figure 11C:
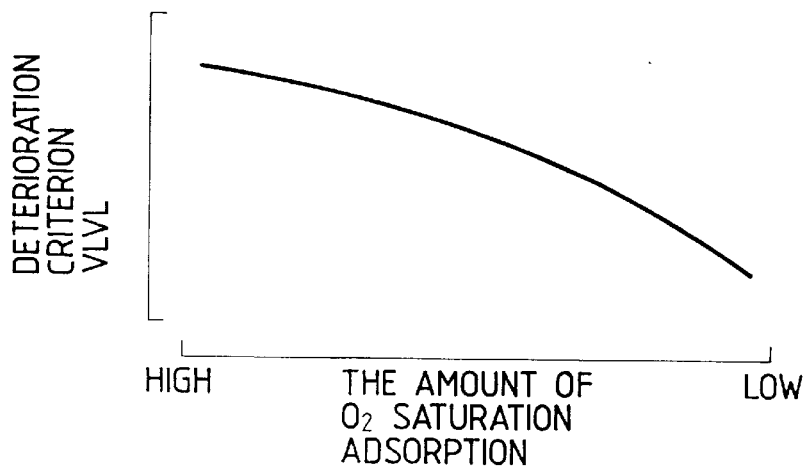

The amount of $O_2$ saturation adsorption of the catalytic converter 27 is also decreased, as shown in FIG. 11(b), as the catalytic converter 27 is aged. This impinges on the output of the oxygen sensor 27, as shown in FIG. 11(a), thereby decreasing the voltage deviation between the output voltage of the oxygen sensor 29 and the target voltage, resulting in a decrease in the integral value VsSUM. Thus, if the deterioration of the oxygen sensor 29 is determined based on the integral value VsSUM, the determination can be made more accurately without the influence of the aged catalytic converter 27 by correcting the deterioration criterion VLVL according to a change in the amount of $O_2$ saturation adsorption of the catalytic converter 27.

Figure 13:
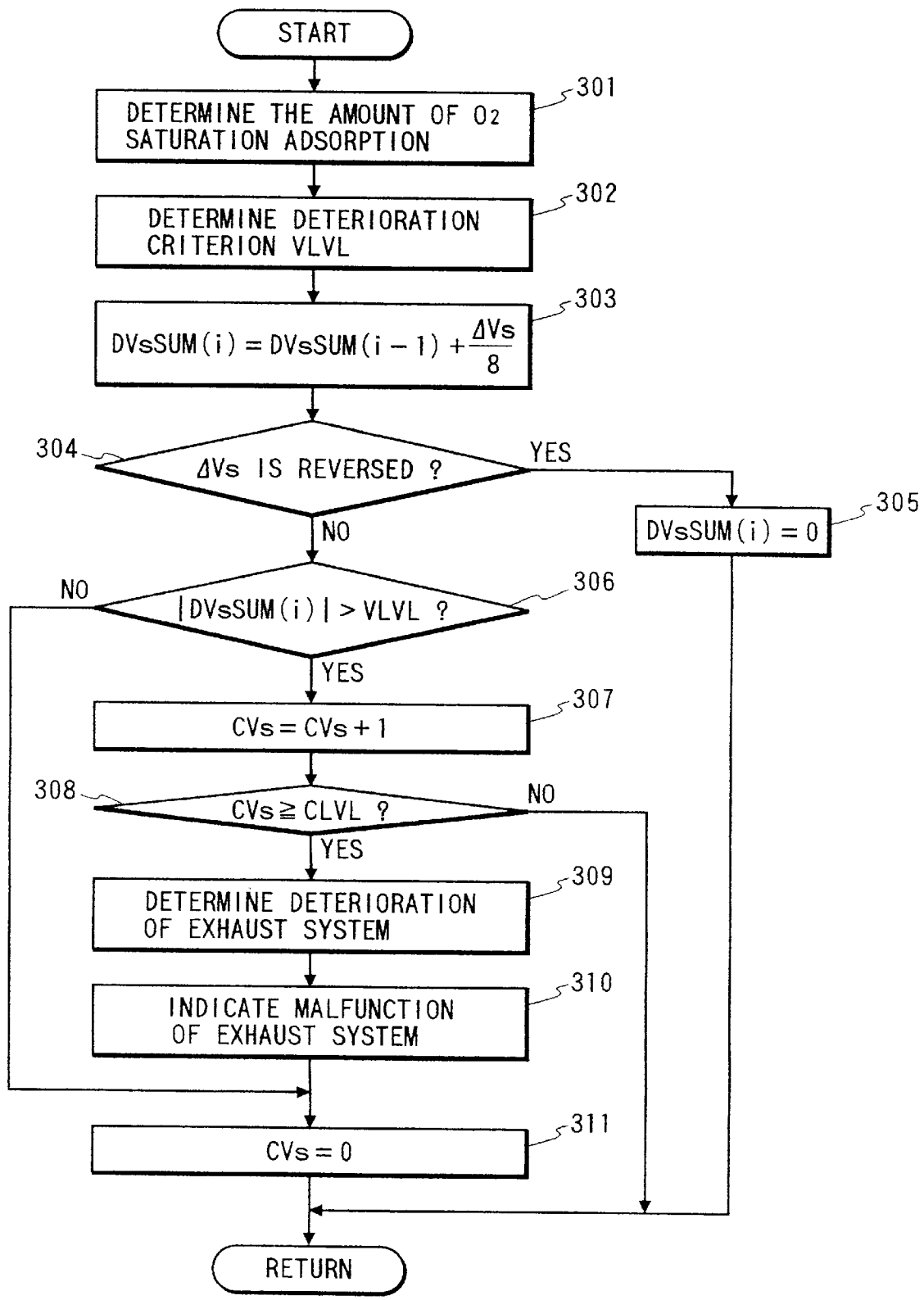
FIG. 13 is a flowchart of a program for determining deterioration of an exhaust system.

The determination of deterioration of the exhaust system will be discussed below with reference to a flowchart in FIG. 13. The shown program is carried out cyclically at a given time interval (e.g., 16 ms or 32 ms) or at a given angular interval (e.g., 180°CA) of the crank shaft of the engine 11.

After entering the program, the routine proceeds to step 301 wherein the amount of $O_2$ saturation adsorption of the catalytic converter 27 is determined in a manner, as taught in Japanese Patent First Publication No. 6-17640, wherein the target air-fuel ratio is first shifted temporarily to change the output voltage of the oxygen sensor 29 above a saturation criterion to determine the amount of $O_2$ saturation adsorption of the catalytic converter 27 based on the then air-fuel ratio data. The saturation criterion is given by an output voltage of the oxygen sensor 29 when the catalytic converter 27 is saturated.

The routine then proceeds to step 302 wherein the deterioration criterion VLVL is determined based on the amount of $O_2$ saturation adsorption of the catalytic converter 27. The deterioration criterion VLVL is, as shown in FIG. 12, decreased as the amount of $O_2$ saturation adsorption of the catalytic converter 27 is decreased.

The routine then proceeds to step 303 wherein the integral value DVsSUM(i) for determination of deterioration of the exhaust system is determined according to the following equation in a blunting operation using $\frac{1}{8}$.

$$DVsSUM(i)=DVsSUM(i-1)+\Delta Vs/8$$

where $\Delta Vs$ is the difference, as derived in step 203, between the output voltage Vs of the oxygen sensor 29 and the target voltage MVs. The blunting operation is for eliminating unwanted disturbance such as noise. Note that a blunting constant may be $\frac{1}{16}$, $\frac{1}{4}$, or $\frac{1}{2}$.

The routine then proceeds to step 304 wherein it is determined whether the voltage deviation $\Delta Vs$ between the output voltage of the oxygen sensor 29 and the target voltage MVs is reversed in level (i.e., "−" to "+" or "+" to "−") or not. This determination is made for determining whether the output voltage of the oxygen sensor 29 is on the rich side or the lean side with respect to the target voltage MVs. If the voltage deviation $\Delta Vs$ is reversed in level, then the routine proceeds to step 305 wherein the integral value DVsSUM(i) is cleared to zero (0) and terminates.

Alternatively, if a NO answer is obtained in step 304, then the routine proceeds to step 306 wherein it is determined whether an absolute value of DVsSUM(i) is greater than the deterioration criterion VLVL or not. If a YES answer is obtained (i.e., |DVsSUM(i)|>VLVL), then it is determined that the exhaust system is deteriorated, and the routine proceeds to step 307 wherein a deterioration counter value CVs is incremented by one (1). A final deterioration determination is not made until the deterioration counter value CVs becomes greater than or equal to a given value CLCL.

Each time this program is performed, and the deterioration of the exhaust system is detected, the deterioration counter value CVs is incremented. If, however, a condition of |DVsSUM(i)| ≦VLVL (i.e., a normal condition) is encountered in step 306 before the deterioration counter value CVs reaches the given value CLCL, then the routine proceeds directly to step 311 wherein the deterioration counter value CVs is cleared. Therefore, when the number of deterioration determinations reaches the given value CLCL, that is, when it is determined in step 308 that the deterioration counter value CVs is greater than or equal to the given value CLCL, the routine proceeds to step 309 wherein it is ultimately determined that the exhaust system is deteriorated. Specifically, the accuracy in determining the deterioration of the exhaust system is improved greatly by repeating the deterioration determination in step 308 several times.

After the exhaust system is ultimately determined to be deteriorated in step 309, the routine proceeds to step 310 wherein the warning lamp 37 installed in an instrument panel near a driver's seat of the vehicle is turned on to indicate that the exhaust system is malfunctioning. The routine then proceeds to step 311 wherein the deterioration counter value CVs is cleared and terminates.

As will be apparent from the above discussion, this embodiment is designed to detect the deterioration of the exhaust system with high accuracy by using the fact that the deterioration of either of the catalytic converter 27 and the oxygen sensor 29 reduces the effect of the feedback control using the output of the oxygen sensor 29 to increase the voltage deviation between the output voltage of the oxygen sensor 29 and the target voltage and by determining the degree of increase in the voltage deviation by comparing the integral value of the voltage deviation with the deterioration criterion.

Further, this embodiment changes the deterioration criterion VLVL, as shown in FIG. 12, according to the amount of $O_2$ saturation adsorption of the catalytic converter 27 based on the fact that, as the catalytic converter 27 ages, the amount of $O_2$ saturation adsorption of the catalytic converter 27 is, as shown in FIG. 11(b), decreased, thereby impinging on the output of the oxygen sensor 27 downstream of the catalytic converter 27 to decrease the voltage deviation between the output voltage of the oxygen sensor 29 and the target voltage, as shown in FIG. 11(a). This achieves the deterioration determination more accurately without the influence caused by the aging of the catalytic converter 27.

Figure 16:
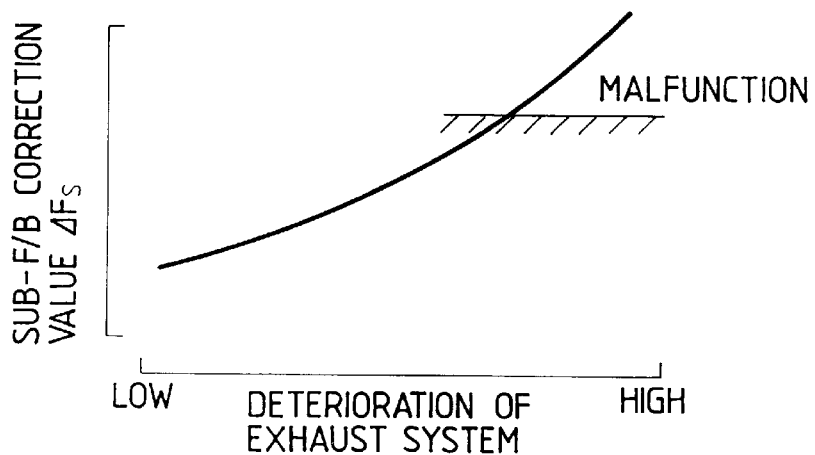
FIG. 16 is a graph which shows the relation between a sub-F/B correction value ΔFs and the degree of deterioration of an exhaust system.

The sub-F/B control using the output of the oxygen sensor 29 downstream of the catalytic converter 27 serves to decrease the voltage deviation between the output voltage of the oxygen sensor 29 and the target voltage. Therefore, if the voltage deviation is increased due to the deterioration of the exhaust system, it will cause the sub-F/B correction value, as shown in FIG. 16, to be increased. It is, thus, advisable that if an absolute value of the sub-F/B correction value $\Delta Fs$ determined in steps 202 to 205 is greater than the deterioration criterion VLVL (i.e., $|\Delta Fs|$ >VLVL), it be determined that the exhaust system is deteriorated. In this case, the upper limit and the lower limit (i.e., C and D in FIG. 4) of the sub-F/B correction value $\Delta Fs$ may be changed according to the amount of $O_2$ saturation adsorption of the catalytic converter 27. Specifically, when the amount of $O_2$ saturation adsorption of the catalytic converter 27 is great, the upper and lower limits are shifted so as to increase a correction range defined therebetween, while when the amount of $O_2$ saturation adsorption of the catalytic converter 27 is small, the upper and lower limits are shifted so as to decrease the correction range. When the sub-F/B correction value $\Delta Fs$ is greater than the upper limit or lower than the lower limit, it is determined that the exhaust system is deteriorated.

It is also desirable that the hysteresis of $\pm \alpha$ be provided to the target voltage under the sub-F/B control, and the voltage deviation $\Delta Vs$ be determined as a difference of the actual voltage Vs of the oxygen sensor 29 from the target voltage having a width of $\pm \alpha$ according to the relation (1) or (2) below. This is because the output voltage Vs of the oxygen sensor 29 is converged on the target voltage under the sub-F/B control, but it is unnecessary to make the deterioration determination since it is apparent that the exhaust system is in a normal condition when the output voltage Vs is near the target voltage, and is also for avoiding an error in determining the deterioration of the exhaust system when the exhaust system is in a normal condition wherein the output voltage Vs of the oxygen sensor 29 changes near the target voltage only on either of the rich and lean sides.

(1) When Vs<the target voltage (=0.5), $\Delta Vs=Vs-$(the target voltage$+\alpha$)

(2) When Vs≦the target voltage (=0.5), $\Delta Vs=Vs-$(the target voltage$-\alpha$)

If the sub-F/B correction value is changed during the sub-F/B control, but the voltage deviation ΔVs between the output voltage of the oxygen sensor 29 and the target voltage exceeds a given value for a preselected period of time, meaning that the response of the oxygen sensor 29 is lowered, it may be determined that the exhaust system is deteriorated.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A deterioration monitoring apparatus for an exhaust system of an internal combustion engine, comprising:

air-fuel ratio controlling means for controlling under feedback control an air-fuel ratio of exhaust emissions flowing upstream of a catalytic converter disposed in said exhaust system of said engine, so that an air-fuel ratio of exhaust emissions flowing downstream of said catalytic converter agrees with a target downstream air-fuel ratio; and deterioration determining means for determining whether any components of said exhaust system are deteriorated based on said air-fuel ratio of said exhaust emissions flowing downstream of said catalytic converter and said target downstream air-fuel ratio, said components of said exhaust system including:

said catalytic converter, an upstream sensor disposed in said exhaust system upstream from said catalytic converter, and a downstream sensor disposed in said exhaust system downstream from said catalytic converter, wherein:

said air-fuel ratio controlling means corrects a target air-fuel ratio based on said air-fuel ratio of said exhaust emissions flowing upstream of said catalytic converter, using a target air-fuel ratio correction value based on said air-fuel ratio of said exhaust emissions flowing downstream of said catalytic converter to determine a feedback correction value, said air-fuel ratio controlling means further corrects an amount of fuel to be injected into said engine based on said feedback correction value, said deterioration determining means determines whether said components of said exhaust system are deteriorated based on said target air-fuel ratio correction value, and said upstream sensor is a linear air-fuel ratio sensor measuring said air-fuel ratio of exhaust emissions flowing upstream of said catalytic converter and outputting a linear sensor signal in proportion to said measured air-fuel ratio, said air-fuel ratio controlling means controls under feedback control said air-fuel ratio indicated by a linear sensor signal outputted from said linear air-fuel ratio sensor so that said air-fuel ratio of exhaust emissions flowing downstream of said catalytic converter agrees with said target downstream air-fuel ratio, and said air-fuel ratio correction value is determined without using said output of said linear sensor signal of said upstream sensor.

2. A deterioration monitoring apparatus for an exhaust system of an internal combustion engine comprising:

an injector for injecting fuel into an induction system of said engine;

an upstream sensor for determining an air-fuel ratio of exhaust emissions flowing upstream of a catalytic converter installed in said exhaust system;

a downstream sensor for determining an air-fuel ratio of exhaust emissions flowing downstream of said catalytic converter;

basic fuel injection determining means for determining a basic amount of fuel to be injected from said injector;

air-fuel ratio controlling means for controlling said air-fuel ratio determined by said upstream sensor under feedback control to correct said air-fuel ratio determined by said downstream sensor to agree with a target downstream air-fuel ratio; and deterioration determining means for determining whether any components of said exhaust system are deteriorated based on said air-fuel ratio determined by said downstream sensor and said target downstream air-fuel ratio, said components of said exhaust system including:

said upstream sensor, said downstream sensor, and said catalytic converter, wherein:

said upstream sensor is a linear air-fuel ratio sensor measuring said air-fuel ratio of exhaust emissions flowing upstream of said catalytic converter and outputting a linear sensor signal in proportion to said measured air-fuel ratio, said air-fuel ratio controlling means controls under feedback control said air-fuel ratio indicated by a linear sensor signal outputted from said linear air-fuel ratio sensor so that said air-fuel ratio of exhaust emissions flowing downstream of said catalytic converter agrees with said target downstream air-fuel ratio, and said deterioration determining means determines whether any components of said exhaust system are deteriorated without using said output of said linear sensor signal of said upstream sensor.

3. A deterioration monitoring apparatus as set forth in claim 2, wherein said deterioration determining means determines whether said components of said exhaust system are deteriorated based on an integral value of a difference between said air-fuel ratio of said exhaust emissions flowing downstream of said catalytic converter and said target downstream air-fuel ratio.

4. A deterioration monitoring apparatus for an exhaust system of an internal combustion engine, comprising:

air-fuel ratio controlling means for controlling under feedback control an air-fuel ratio of exhaust emissions flowing upstream of a catalytic converter disposed in said exhaust system of said engine, so that an air-fuel ratio of exhaust emissions flowing downstream of said catalytic converter agrees with a target downstream air-fuel ratio;

saturation adsorption determining means for determining an amount of saturation adsorption of said catalytic converter, deterioration determining means for determining whether said exhaust system is deteriorated based on said amount of saturation adsorption determined by said saturation adsorption means, said air-fuel ratio of said exhaust emissions flowing downstream of said catalytic converter, and said target downstream air-fuel ratio, said deterioration determining means including:

deterioration criterion determining means for determining a deterioration criterion based on said amount of saturation adsorption of said catalytic converter, and total value determining means for determining differences between said air-fuel ratio of said exhaust emissions flowing downstream of said catalytic converter and said target downstream air-fuel ratio at every given time interval to determine a total value thereof, said deterioration determining means determining that said exhaust system is deteriorated when said total value is greater than a given value.

5. A deterioration monitoring apparatus for an exhaust system of an internal combustion engine, comprising:

air-fuel ratio controlling means for controlling under feedback control an air-fuel ratio of exhaust emissions flowing upstream of a catalytic converter disposed in said exhaust system of said engine, so that an air-fuel ratio of exhaust emissions flowing downstream of said catalytic converter agrees with a target downstream air-fuel ratio, said air-fuel ratio controlling means correcting a target air-fuel ratio based on said air-fuel ratio of said exhaust emissions flowing upstream of said catalytic converter, using a target air-fuel correction value based on said air-fuel ratio of said exhaust emissions flowing downstream of said catalytic converter to determine a feedback correction value, said air-fuel ratio controlling means further correcting an amount of fuel to be injected into said engine based on said feedback correction value, saturation adsorption determining means for determining an amount of saturation adsorption of said catalytic converter, deterioration determining means for determining whether said exhaust system is deteriorated based on said amount of saturation adsorption determined by said saturation adsorption means, said air-fuel ratio of said exhaust emissions flowing downstream of said catalytic converter, and said target downstream air-fuel ratio, said deterioration determining means determines a deterioration criterion based on said amount of saturation adsorption of said catalytic converter and determines that said exhaust system is deteriorated when said target air-fuel correction value is greater than said deterioration criterion.

* * * * *